United States Patent [19]
Nuyts

[11] Patent Number: 5,677,780
[45] Date of Patent: Oct. 14, 1997

[54] METHOD OF IMPROVING THE ELECTRICAL EYE MARGIN OF AN OPTICAL FIBER TRANSMISSION SYSTEM HAVING SINGLE MODE AND DISPERSION COMPENSATING FIBER SEGMENTS

[75] Inventor: Roeland Johannes Marie Wilhelm Nuyts, Macungie, Pa.

[73] Assignee: Lucent Technologies Inc., Murray Hill, N.J.

[21] Appl. No.: 524,308

[22] Filed: Sep. 6, 1995

[51] Int. Cl.$^6$ ............................................. H04B 10/12
[52] U.S. Cl. ........................ 359/161; 359/173; 359/188
[58] Field of Search .................................. 359/161, 173, 359/179; 385/24

[56] References Cited

U.S. PATENT DOCUMENTS

| | | | |
|---|---|---|---|
| 5,343,322 | 8/1994 | Pirio et al. | 359/161 |
| 5,359,450 | 10/1994 | Ramachandran et al. | 359/188 |
| 5,361,319 | 11/1994 | Antos et al. | 385/123 |
| 5,365,362 | 11/1994 | Gnauck et al. | 359/161 |
| 5,539,563 | 7/1996 | Park | 359/161 |
| 5,559,920 | 9/1996 | Charaplyvy et al. | 359/115 |

*Primary Examiner*—Leslie Pascal
*Attorney, Agent, or Firm*—John A. Caccuro

[57] ABSTRACT

The self-phase modulation (SPM) effect in a dispersion compensating fiber (DCF) segment of an optical fiber transmission system is used to reduce the required length of the DCF segment needed to compensate the chromatic dispersion of a single mode fiber (SMF) segment of the system. It was determined that the length of the DCF segment at which the widest opening of the electrical eye diagram margin occurs, for a given optical input power to the DCF segment, decreases with increasing optical input power to the DCF segment. Increasing the optical input power to and reducing the length of the DCF segment thus both improves bit error rate of the system and reduces the cost for compensating for dispersion.

8 Claims, 3 Drawing Sheets

METHOD OF IMPROVING THE ELECTRICAL EYE MARGIN OF AN OPTICAL FIBER TRANSMISSION SYSTEM HAVING SINGLE MODE AND DISPERSION COMPENSATING FIBER SEGMENTS

TECHNICAL FIELD OF THE INVENTION

This invention relates to optical fiber transmission systems including standard single mode fiber and dispersion compensating fiber and, more particularly, to a method of optimizing the electrical eye margin in such systems.

BACKGROUND OF THE INVENTION

Many prior art optical fiber transmission systems use a single mode fiber (SMF) having unacceptable amounts of chromatic dispersion. This chromatic dispersion is often compensated by using a length of dispersion compensating fiber (DCF) at the receiver location to reduce the inter-symbol interference (ISI) and improve the electrical eye margin of the system. In an attempt to improve the electrical eye margin, the optical power into the DCF was often increased but this, undesirably, resulted in increased inter-symbol interference (ISI) due to self-phase modulation (SPM). Thus there is a continuing need to improve the electrical eye margins of existing SMF optical transmission systems.

SUMMARY OF THE INVENTION

The present invention uses the self-phase modulation SPM effect in dispersion compensating fiber DCF to reduce the required length of DCF segment used to compensate the chromatic dispersion in an optical fiber transmission system. I have determined that the length of the DCF segment at which the widest opening of the electrical eye diagram occurs, for a given optical input power to the DCF segment, decreases with increasing optical input power to the DCF segment. Moreover, since the opening of the eye diagram does not diminish much with increasing optical input power, the lowest system bit error rate (BER) and shortest length of DCF segment occurs at increased optical input powers to the DCF segment.

More particularly, I have developed a method of improving a bit error rate of an optical transmission system including a single mode fiber (SMF) segment and a dispersion compensating fiber (DCF) segment by increasing a power level into the DCF segment to be in the range from greater than negligible self-phase modulation (SPM) level to below the ($P_{th,DCF}$) level and then shortening the length of the DCF segment to increase an electrical eye margin of the system. The method may be improved further by increasing a power level into the SMF segment to be in the range from greater than the negligible SPM to below the stimulated Brillouin scattering threshold ($P_{th,SMF}$) level.

DETAILED DESCRIPTION

In the following description, each item or block of each figure has a reference designation associated therewith, the first number of which refers to the figure in which that item is first located (e.g., 101 is located in FIG. 1).

Figure 1:
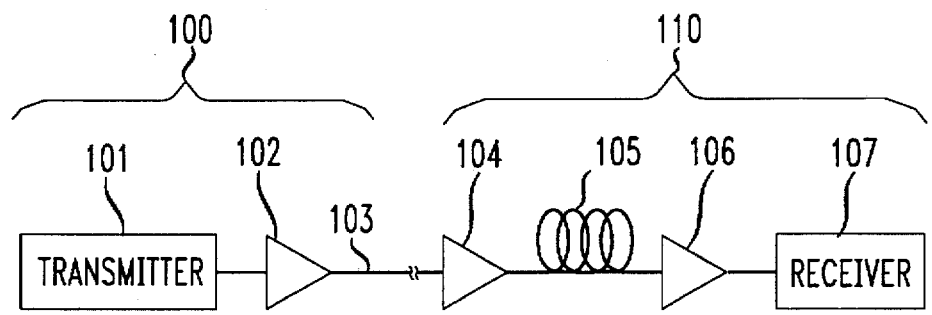
FIG. 1 is an illustrative block diagram of a typical optical transmission system useful in describing the operation of the present invention.

With reference to FIG. 1, a typical prior art optical transmission system is described. A typical optical transmission system would include a transmitter location 100, a transmission fiber 103 and a receiver location 110. The transmitter location includes an optical transmitter 101 and optical amplifier 102. Optical transmitter 101, illustratively, operates at a 1.5 μm signal wavelength. Optical amplifier 102 is used to boost the optical power from the transmitter 101 to a high level for input to the transmission fiber 103. The transmission fiber 103 is a span of standard SMF (single mode fiber) with positive dispersion coefficient and will be referred to hereinafter as SMF segment 103. The length of fiber 103 is assumed to be longer than the dispersion limit (which is, for example, 50 km for a 10 Gb/s modulated signal). Since the transmission distance exceeds the dispersion limit, compensation of the SMF dispersion is needed.

Dispersion compensating fiber (DCF) 105 at receiver location 110, having a negative dispersion coefficient at the signal wavelength, is used for the dispersion compensation. The receiver location 110 includes optical amplifier 104, DCF segment 105, optical amplifier 106 and receiver 107. Optical amplifier 104 amplifies the optical signal exiting transmission fiber 103 before entering the DCF segment 105 to prevent the optical signal from further attenuation which would degrade the optical S/N ratio severely and deteriorate system bit error rate (BER) performance significantly. Optical amplifier 106 amplifies the optical signal exiting the DCF segment 105 to an acceptable power level for the optical receiver 107. If the optical power level at the output of the DCF segment 105 is acceptable for receiver 107, optical amplifier 106 can be omitted.

If the transmission system of FIG. 1 is a linear system, the transmitter pulse shape is completely restored at the receiver location 110 by using the exact length of dispersion compensating fiber DCF 105 to compensate for the SMF segment 103. However, the transmission system is not linear. As a result, a higher optical power level at the input to the SMF segment 103 causes the signal to experience increased self-phase modulation (SPM) induced by the Kerr effect. The SPM leads to pulse compression in our example since the dispersion of the SMF segment 103 has a positive sign. This SPM effect cancels the pulse broadening by chromatic dispersion in the first part of the SMF segment 103. For this reason, the dispersion in the standard fiber needs to be undercompensated ($|D_{DCF}|<|D_{SMF}|$) to achieve the smallest inter-symbol Interference (ISI) system penalty ($D_{DCF}$ and $D_{SMF}$ are the total dispersion of the DCF 105 and SMF 103 segments, respectively). The upper limit for increasing the optical power level to the SMF segment 103 is set by the stimulated Brillouin scattering threshold ($P_{th,SMF}$) level of the SMF.

Figure 2A:
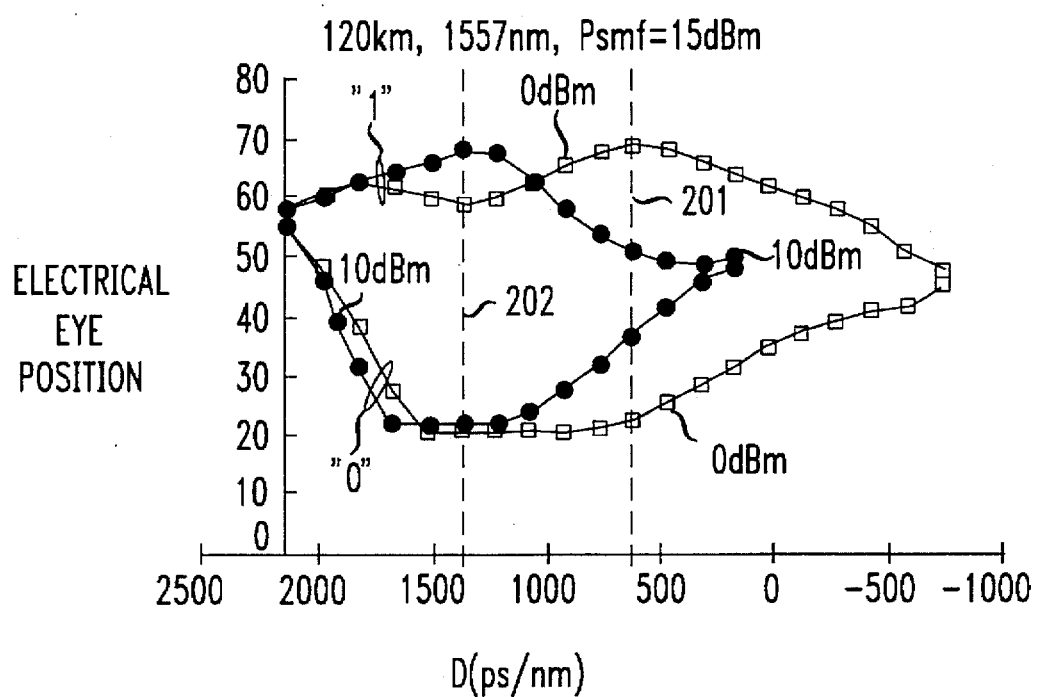
FIGS. 2a and 2b are graphs illustrating calculated eye positions as a function of total dispersion for different DCF power levels (0 and 10 dBm) for a +15 dBm (FIG. 2a) and a +17.5 dBm (FIG. 2b) launched optical power level into the SMF fiber.
Figure 2B:
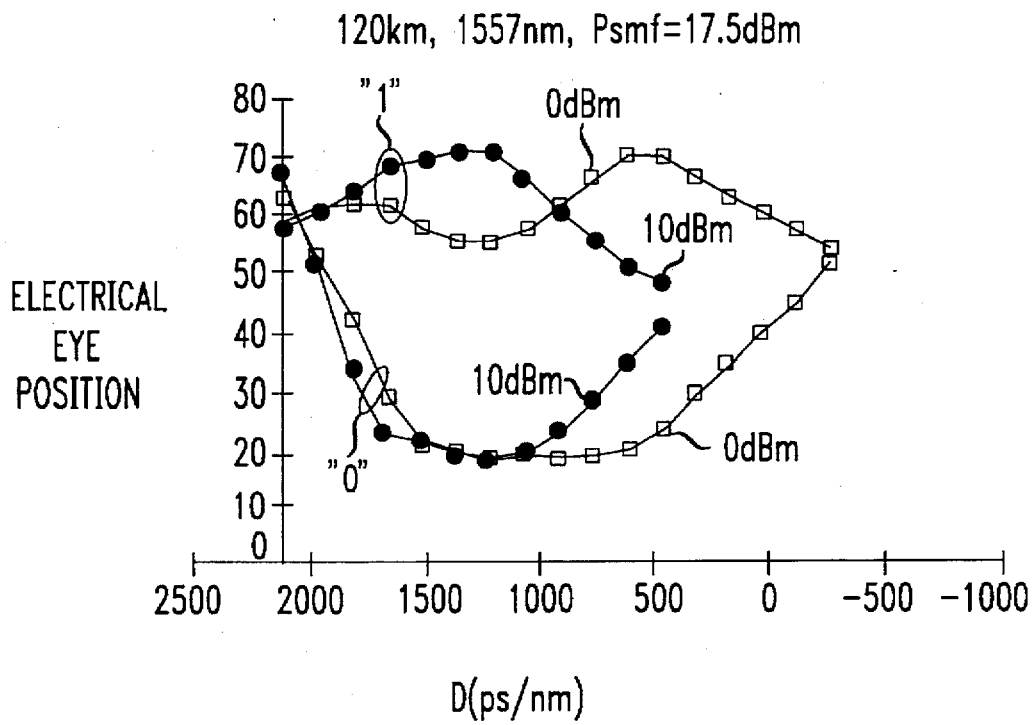

Prior solutions assumed that SPM effect in the DCF segment 105 would only distort optical signals and degrade the system performance. In accordance with my invention, I use a method of using the SPM effect in DCF segment 105 to reduce the required length of the DCF segment 105 used to compensate the chromatic dispersion in an optical fiber transmission system. I have determined that the length of the DCF segment 105 at which the widest opening of the electrical eye margin occurs, for a given optical input power to the DCF segment 105, decreases with increasing optical input power to the DCF segment 105. This reduces the required length of the DCF segment 105 and is therefore attractive from an economical point of view. Further, the increased optical power level at the input of the optical amplifier 106 following the DCF segment 105 improves the optical S/N ratio at the receiver 107. In addition, the input power into the optical transmission fiber (SMF) 103 can be increased without incurring additional ISI (inter-symbol interference) penalty as is shown in FIGS. 2a and 2b and described below. This enables the increase in the input power to the optical amplifier 104 and therefore further increases the optical S/N ratio at the receiver location 110.

FIG. 2 shows calculations of the electrical eye position ('0'- and '1'-ISI-levels) as a function of total dispersion $D=D_{SMF}+D_{DCF}$ for optical launching powers into the SMF segment 103 of +15 dBm (FIG. 2a) and +17.5 dBm (FIG. 2b) and for launching powers into the concurrent DCF segment 105 of 0 dBm and +10 dBm. The eye position is a convenient graphical technique for determining the effects of signal degradation introduced to pulses as they travel to the receiver 107.

The graphs of FIGS. 2a and 2b are generated using the method described in R. J. Nuyts et al., "Dispersion Equalization of a 10 Gb/s Repeatered Transmission System Using Dispersion Compensating Fibers," to be published.

In order to investigate the pulse propagation in nonlinear, dispersive, lossy fibers, I used the model presented in D. Marcuse's *Theory of Dielectric Optical Waveguides* (San Diego: Academic, 1991) and in D. Marcuse et al., "Effect of Fiber Nonlinearity on Long-Distance Transmission," *JLT*, Vol. 9, No. 1, January 1991 (pages 121–128), using the scalar approximation for the electrical field.

In this approximation, the electrical field is split into a slowly and rapidly varying part according to:

$$E = f(x,y) E(z,t) e^{i(\omega_c t - \beta_c z)} \quad (1)$$

where f(x,y) is the transverse field distribution of the electrical field; E(z,t) is the slowly varying envelope of the electrical field; $\omega_c$ is the optical carrier frequency; and $\beta_c$ is the propagation constant at the optical carrier frequency.

The slowly varying field envelope obeys the following nonlinear differential equation (nonlinear Schrödinger equation):

$$\frac{\delta E}{\delta z} + \beta_1 \frac{\delta E}{\delta t} - \frac{i}{2} \beta_2 \frac{\delta^2 E}{\delta t^2} - \frac{1}{6} \beta_3 \frac{\delta^3 E}{\delta t^3} + aE = -ikn_2 |E|^2 E \quad (2)$$

where $\beta_1$ is the group delay (which can be set to zero); $\beta_2$ is the first-order group velocity dispersion (GVD) and $\beta_3$ is the second-order GVD; 'a' is the absorption coefficient of the electrical field; and $n_2$ is the nonlinear refractive index related to the nonlinear coefficient $N_2$ (which can be measured in several ways) by:

$$n_2 = \frac{n_0}{2Z_0} N_2 \quad (3)$$

where $n_0$ is the linear refractive index of the fiber and $Z_0$ is the wave impedance in free space. $\beta_2$ and $\beta_3$ are related to the dispersion coefficient D(λ) and its derivative to wavelength (which can be measured using well-known techniques) by:

$$\beta_2 = -\frac{\lambda^2}{2\pi c} D \quad (4)$$

$$\beta_3 = \frac{\lambda^3}{(2\pi c)^2} \cdot \left( D + \lambda \frac{\delta D}{\delta \lambda} \right) \quad (5)$$

From (1), the slowly varying field envelope can be written as a superposition of waves as follows:

$$E(t, z) = \int_{-\infty}^{\infty} \phi(z, \omega) e^{i[(\omega-\omega_c)t-(\beta-\beta_c)z]} d\omega \quad (6)$$

Addition of a loss term, substitution of the propagation constant β by the first four terms of its Taylor series expansion at the carrier frequency and translation of the spectrum to baseband frequencies using $\Omega = \omega - \omega_c$ results in:

$$E(t, z) = \quad (7)$$

$$e^{-\alpha z} \int_{-\infty}^{\infty} \phi(z, \Omega) \exp\left[ -\frac{i}{2} \Omega^2 \left( \beta_2 - \frac{\Omega}{3} \beta_3 \right) z \right] e^{i(\Omega t - \beta_{1} z)} d\Omega$$

assuming that first- and second-order GVD are constant along the fiber.

By introducing an auxiliary function G(z,Ω) in the right-side of the equation, the term $|E|^2 E$ can be expressed as:

$$|E|^2 E = \quad (8)$$

$$e^{-\alpha z} \int_{-\infty}^{\infty} G(z, \Omega) \exp\left[ -\frac{i}{2} \Omega^2 \left( \beta_2 - \frac{\Omega}{3} \beta_3 \right) z \right] e^{i(\Omega t - \beta_{1} z)} d\Omega$$

Note that both equations (7) and (8) are Fourier transforms and can therefore be replaced by FFT (Fast Fourier Transforms) in the numerical model.

Substitution of (7) and (8) into (2) leads to the following linear, first-order, differential equation:

$$\frac{\delta \phi(z, \Omega)}{\delta z} = -ikn_2 G(z, \Omega) \quad (9)$$

which can be easily solved numerically: at z=0, the power spectrum φ(0,Ω) of the electrical field E(t,0) is given by:

$$\phi(0, \Omega) = \frac{1}{2\pi} \int_{-\infty}^{\infty} E(y, 0) e^{-i\Omega t'} dt' \quad (10)$$

in which t' equals $$t - \frac{\beta_1 z}{\Omega},$$

and is a frame of reference moving at the velocity of the wave propagating through the fiber. Also, G(0,Ω) is calculated from the inverse of the Fourier transform of (8). Then by substituting φ(0,Ω) and G(0,Ω) in (9), φ(dz,Ω) is calculated using a predictor corrector scheme as described in W. H. Press et al., *Numerical Recipes In C* (Cambridge: Cambridge University Press, 1992). Next, E(t,dz) is calculated from the Fourier transform of φ(dz,Ω) using (7). Finally, $|E|^2 E$ is then used to calculate G(dz,Ω) whereafter the cycle begins anew. Propagation of the pulse is then calculated by stepping through the fiber with steps dz where dz must be kept sufficiently small to avoid large inaccuracy in the simulation. The optical power P(t,z) can be calculated from the electrical field E(t,z) using:

$$P(t,z) = \left(\frac{n_0 A_{eff}}{2Z_0}\right) |E(t,z)|^2$$

and from the optical power P(t,z) we can easily calculate the eye diagram and eye margin as shown in FIGS. 2a and 2b, for example.

If a pin-diode is used for detection (i.e., in receiver 107 of FIG. 1), an electrical current $I_s$ is generated proportional to the optical power P(t,z) into the receiver. In addition to the signal current $I_s$, the ASE (Amplified Spontaneous Emission) photocurrent $I_{sp}$ due to the use of the optical fiber amplifiers is generated:

$$I_s = \left(\frac{\eta e}{h\nu}\right) P(t,z)$$

$$I_{sp} = \frac{I_s}{SNR} \cdot \frac{B_0}{R}$$

where $\eta$ is the efficiency of the pin-diode, 'e' is the electron charge, 'h' is Planck's constant and 'v' is the optical frequency. SNR is the optical signal-to-noise ratio measured within a bandwidth; R and $B_0$ is the bandwidth of the used optical filter. This is further discussed in the article by N. A. Olsson entitled "Lightwave systems with optical amplifiers" (*JLT*, Vol. 8, No. 7, July 1989, pages 1071–1082).

Figure 4:
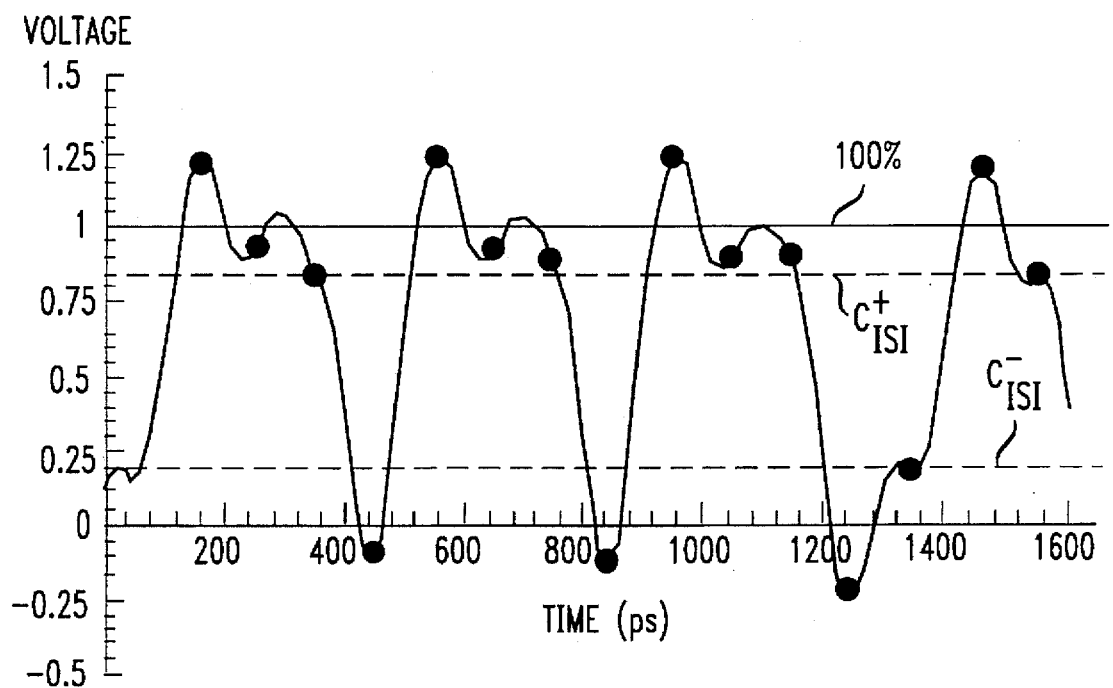
FIG. 4 shows an illustrative electrical signal after detection and filtering by the system receiver.

The pin-diode is followed by a pre- and post-amplifier in order to increase the sensitivity. The frequency responses of both are included in the simulation by using FFTs (Fast Fourier Transforms) to take into account additional ISI caused by these electrical circuits. An example of an electrical signal after filtering in the receiver is shown in FIG. 4, where the voltage scale is normalized. The signal shown here is modulated at the 10 Gb/s data rate. In FIG. 4, the samples (at $t_s$=50 ps, 150 ps . . . etc.) are indicated by dots on the trace. The figure clearly shows the worst case ISI from the '1'- and '0'-level, $c_{ISI}^+$ and $c_{ISI}^-$, respectively, which are used in the calculations for the bit error rate (BER). The variances of the electrical noise contributions are given by:

$$N_{shot}(\text{mark}) = 4eq_{SI}^+ I_s B_e$$

$$N_{shot}(\text{space}) = 4eq_{SI}^- I_s B_e$$

$$N_{shot}(ASE) = 2eI_{sp}B_e$$

$$N_{sp-sp} = 4I_{sp}^2 \frac{B_e(2B_0 - B_e)}{2B_0^2}$$

$$N_{s-sp}(\text{mark}) = 4I_{sp}q_{SI}^+ I_s \frac{B_e}{B_0}$$

$$N_{s-sp}(\text{space}) = 4q_{SI}^- I_{sp} I_s \frac{B_e}{B_0}$$

$$N_{rec} = \int_0^\infty \frac{d\langle i^2\rangle}{df} H^2(f) df$$

where $B_e$ is the effective bandwidth of pre- and post-amplifier, H(f) is the frequency response of the pre- and post-amplifier in the receiver, and $d\langle i^2\rangle/df$ is the measured noise spectral density of the receiver.

The standard deviation of the noise distributions at the '0'- and '1'-level are now given by:

$$\sigma_1 = \sqrt{N_{shot}(\text{mark}) + N_{shot}(ASE) + N_{rec} + N_{sp-sp} + N_{s-sp}(\text{mark})}$$

$$\sigma_0 = \sqrt{N_{shot}(\text{space}) + N_{shot}(ASE) + N_{rec} + N_{sp-sp} + N_{s-sp}(\text{space})}$$

and the BER is given by:

$$BER = \frac{1}{4} erfc\left[\sqrt{2}\left(\frac{\tau - q_{SI}^-}{\sigma_0}\right)\right] + \frac{1}{4} erfc\left[\sqrt{2}\left(\frac{(1 - q_{SI}^+ - \tau)I_s}{\sigma_1}\right)\right]$$

from which the minimum achievable BER of the transmission system or the system electrical margin (the margin of the decision level voltage where BER<$10^{-15}$) can be calculated.

FIGS. 2a and 2b show calculations for the electrical eye margin at a $10^{-15}$ BER as a function of total dispersion for an illustrative system. The illustrative system assumes a 1.557 nm transmitter 101 and a 120 km long SMF segment 103 with either a 15 dBm power level (FIG. 2a) or a 17.5 dBm power level (FIG. 2b) into SMF segment 103. In FIG. 2a and FIG. 2b, the '0' and '1' levels where the BER=$10^{-15}$ of the electrical eye margin are shown for both a 0 dBm and +10 dBm power level into DCF segment 105. The S/N ratio used in the calculation was determined from the noise figures (5.5 dB) and the input power levels of amplifiers 102, 104 and 106.

From FIGS. 2a and 2b, we can draw several conclusions. First, from FIG. 2a, the maximum electrical eye margin in the case of +15 dBm launched optical power into the SMF segment 103 is 46.8% for a 0 dBm power level and 46.1% for a +10 dBm power level at the input of the DCF, approximately the same. Therefore, using an input power level (e.g., +10 dBm) into the DCF segment 105 which is (1) far above the level where there is no SPM (—3 dBm for the DCF segment 105 used in this calculation) and (2) near the stimulated Brillouin scattering (SBS) level (~+10 dBm for DCF used in this calculation) will not lead to significant decrease of the optimum electrical eye margin due to SPM. Moreover, since the system bit error rate (BER) is a function of eye margin and S/N ratio, the increased power level will increase the S/N ratio and hence reduce the BER of the system. Additionally, the optimum DCF segment 105 length needed to provide the maximum electrical eye margin has decreased significantly over what was needed in prior art transmission systems. For example, in FIG. 2a we assumed a total dispersion $D_{SMF}$ in the SMF segment 103 of +2131 ps/nm (using a positive dispersion coefficient of 17.76 ps/nm -km for the 120 km length of SMF segment 103). The total dispersion value D ($D_{SMF}+D_{DCF}$) providing the widest electrical eye margin is +786 ps/nm (shown as 201 in FIG. 2) for a launching power level of 0 dBm and +1384 ps/nm (shown as 202 in FIG. 2) for a launching power level of +10 dBm at the input of DCF segment 105. Assuming a dispersion coefficient in the DCF of −75 ps/nm, this means a reduction in required DCF length of 8 km from the 18 km (required by the prior techniques) to 10 km (required by my method). This is economically attractive (since DCF is expensive) and leads further to a more than 10 dB higher power level at the input of optical amplifier 106 and therefore to a higher optical S/N ratio at the input of the receiver 107. As a result, the BER of the system is dramatically reduced over comparable prior art systems.

As shown in FIG. 2b, if the optical power launched into the SMF segment 103 is increased from +15 dBm to +17.5 dBm, the optimum length of the DCF segment 105 remains about the same for both cases of 0 and +10 dBm launched optical power at the input of DCF segment 105. The maximum achievable electrical eye margin is 50.3% for an optical power level of 0 dBm and 51.4% for an optical power level of +10 dBm into DCF segment 105. This means that the launching power into the SMF segment 103 can be increased (1) far above the power level where there is negligible SPM (~4 dBm for the SMF segment 103 used in this calculation) and (2) almost to the SBS threshold level (~+18 dBm for the SMF used in this calculation) without incurring a severe ISI penalty due to SPM. Moreover, the increased power improves the optical S/N ratio at the receiver 107 and the maximum achievable electrical eye margin at the $10^{-15}$ BER. These results show that the SPM effect in both the DCF and SMF segments can be used to decrease the required length of the DCF segment 105 needed to compensate for dispersion in the SMF segment 103 and increase the optical S/N ratio at the receiver 107 input which together lead to an improved system performance (reduced BER, improved eye margins) as well as an economical advantage.

Figure 3:
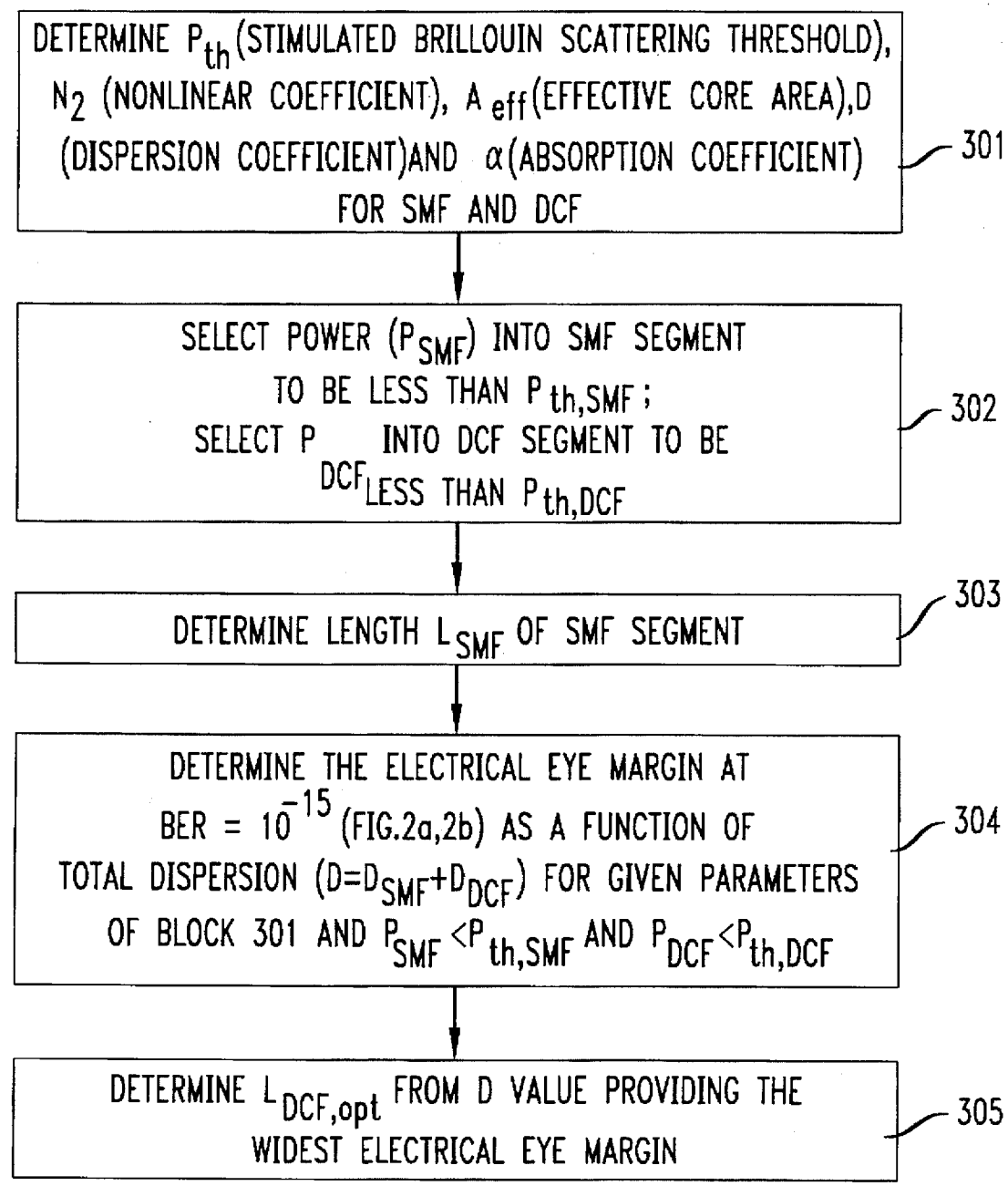
FIG. 3 is a flowchart describing my method of using the SPM effect to reduce the amount of DCF fiber to compensate for chromatic dispersion in the SMF fiber.

With reference to the flowchart of FIG. 3, the general method for determining the optimum length of the DCF segment ($L_{DCF,opt}$) is described as follows:

In step 301, determine the stimulated Brillouin scattering threshold ($P_{th}$), the nonlinear coefficient ($N_2$), the effective core area ($A_{eff}$), the dispersion coefficient (D) and the absorption coefficient ($\alpha$) for both the SMF and DCF segments. In step 302, select the optical power ($P_{SMF}$) into the SMF segment 103 to be less than $P_{th,SMF}$ and select optical power ($P_{DCF}$) into the DCF segment 105 to be less than $P_{th,DCF}$. When the maximum optical powers are utilized, the system obtains its highest S/N ratio for the used SMF and DCF lengths. In step 303, determine the length ($L_{SMF}$) of the SMF segment 103. In step 304, calculate the electrical eye margin at $10^{-15}$ BER (shown in FIGS. 2a and 2b) as a function of the total dispersion ($D=D_{SMF}+D_{DCF}$) for the parameters determined in step 301 and also using the $10^{-15}$ BER (shown in FIGS. 2a and 2b) as a function of the total dispersion ($D=D_{SMF}+D_{DCF}$) for the parameters determined in step 301 and also using the selected power levels ($P_{SMF}$) and ($P_{DCF}$). In step 305, once the D value which provides the widest electrical eye margin is determined (e.g., 202 of FIG. 2a), the length of the DCF segment 105 ($L_{DCF,opt}$) which needs to be added to the SMF segment 103 to maximize the electrical eye margin is determined. This maximizes the electrical eye margin for the system at the powers $P_{SMF}$ and $P_{DCF}$. The maximized electrical eye margin produces the lowest BER for the system.

What has been described is merely illustrative of the application of the principles of the present invention. Other arrangements and methods can be implemented by those skilled in the art without departing from the spirit and scope of the present invention.

I claim:

1. A method of improving bit error rate of a dispersion compensated optical transmission system including a single mode fiber (SMF) segment and a dispersion compensating fiber (DCF) segment, comprising the steps of 1) increasing a power level into the DCF segment from an existing operating power level to a new power level in the range from greater than the negligible self-phase modulation (SPM) level to below the stimulated Brillouin scattering threshold ($P_{th,DCF}$) level and 2) shortening the length of the DCF segment to a length that is less than the length needed to compensate for the dispersion of the SMF segment, the result of performing both steps 1 and 2 is an increase in an electrical eye margin of the system.

2. The method of claim 1 further comprising the step of increasing a power level into the SMF segment to be in the range from greater than negligible SPM level to below the $P_{th,SMF}$ level.

3. The method of claim 1 wherein the power level to the DCF segment is set near the stimulated Brillouin scattering threshold ($P_{th,DCF}$) level prior to performing the shortening of the length of the DCF segment.

4. A method of improving bit error rate of an optical transmission system including a single mode fiber (SMF) segment and a dispersion compensating fiber (DCF) segment, comprising the steps of increasing a power level into the DCF segment to be in the range from greater than the negligible self-phase modulation (SPM) level to below the stimulated Brillouin scattering threshold ($P_{th,DCF}$) level and shortening the length of the DCF segment to increase an electrical eye margin of the system, wherein the shortening step includes the steps of calculating the BER values as a function of total dispersion of the system using $P_{SMF}$ and $P_{DCF}$ power levels and dispersion coefficients for the SMF and DCF segments, where $P_{SMF}$ is a power level into the SMF segment below the stimulated Brillouin scattering threshold ($P_{th,DCF}$) level and $P_{DCF}$ is a power level of the DCF segment below the $P_{th,DCF}$ level;

generating an electrical eye margin using the calculated BER values; and selecting a length of DCF segment to produce a desired BER for the system.

5. The method of claim 4 wherein the selecting step includes the steps of selecting a total dispersion for the system, which has the lowest BER for desired $P_{SMF}$ and $P_{DCF}$ power levels; and determining the length of the DCF segment from the selected total dispersion.

6. A method of improving bit error rate (BER) of an optical transmission system including a single mode fiber (SMF) segment and a dispersion compensating fiber (DCF) segment, comprising the steps of calculating the BER values as a function of total dispersion of the system using $P_{SMF}$ and $P_{DCF}$ power levels and absorption and dispersion coefficients for the SMF and DCF segments, where $P_{SMF}$ is a power level into the SMF segment below the stimulated Brillouin scattering threshold ($P_{th,SMF}$) level and $P_{DCF}$ is a power level of the DCF segment below the $P_{th,DCF}$ level;

selecting a total dispersion for the system, which has the lowest BER for desired $P_{SMF}$ and $P_{th,DCF}$ power levels; and determining the length of the DCF segment from the selected total dispersion.

7. A low bit error rate optical transmission system, comprising a single mode fiber (SMF) segment connected to an optical transmitter and having a length and a dispersion level and a dispersion compensating fiber (DCF) segment connected to the SMF segment and arranged to receive an optical input power self-modulation (SPM) level and which is near the stimulated Brillouin scattering threshold ($P_{th,DCF}$) level of the DCF segment, the DCF segment having a first length which has a dispersion which is substantially less than is needed to cancel the dispersion of the SMF segment, said first length of the DCF segment being selected to be less than a second length of DCF segment which would be necessary to cancel the dispersion of the SMF segment, said first length of the DCF segment effective to reduce a bit error rate of the system below that achievable using the second length of DCF segment.

8. A method of improving bit error rate of a dispersion compensated optical transmission system including a single mode fiber (SMF) segment and a dispersion compensating fiber (DCF) segment, comprising the steps of 1) increasing a power level into the DCF segment from an existing operating power level to a new power level in the range from greater than the negligible self-phase modulation (SPM) level to below the stimulated Brillouin scattering threshold ($P_{th,DCF}$) level and 2) adjusting the length of the DCF segment to a length which has a dispersion which is less than is needed to cancel the dispersion of the SMF segment, the results of performing both steps 1 and 2 is a reduced bit error rate for the system.

* * * * *